(12) United States Patent
Liang

(10) Patent No.: US 12,523,809 B1
(45) Date of Patent: Jan. 13, 2026

(54) OPTICAL FIBER LIGHT SOURCE

(71) Applicant: Shenzhen Wana Technology Co., Ltd., Guangdong (CN)

(72) Inventor: Weijian Liang, Guangdong (CN)

(73) Assignee: Shenzhen Wana Technology Co., LTD, Shenzhen (CN)

( * ) Notice: Subject to any disclaimer, the term of this patent is extended or adjusted under 35 U.S.C. 154(b) by 0 days.

(21) Appl. No.: 18/946,618

(22) Filed: Nov. 13, 2024

(30) Foreign Application Priority Data

Jul. 12, 2024 (CN) .......................... 202421649759.8

(51) Int. Cl.
*F21V 31/00* (2006.01)
*F21S 9/02* (2006.01)
*F21V 8/00* (2006.01)

(52) U.S. Cl.
CPC .............. *G02B 6/0006* (2013.01); *F21S 9/02* (2013.01); *F21V 31/005* (2013.01)

(58) Field of Classification Search
CPC .. G02B 6/0008; G02B 6/0006; G02B 6/3624; F21V 23/0414; F21V 14/045; F21V 21/0816; F21V 31/005; F21S 9/02
See application file for complete search history.

(56) References Cited

U.S. PATENT DOCUMENTS

| | | | | |
|---|---|---|---|---|
| 7,731,404 B2* | 6/2010 | Coushaine | ............. | G02B 6/001 362/570 |
| 2004/0223321 A1* | 11/2004 | Crowley | ................... | F21L 4/06 362/108 |
| 2023/0184400 A1* | 6/2023 | Lee | ......................... | F21S 9/022 307/66 |

* cited by examiner

*Primary Examiner* — William J Carter
(74) *Attorney, Agent, or Firm* — Zhigang Ma

(57) ABSTRACT

The invention relates to the technical field of light source equipment, and discloses an optical fiber light source, including: a housing; a battery is installed inside the housing; a circuit board is installed inside the housing, and the circuit board is electrically connected to the battery; a key assembly is arranged on the circuit board to connect or disconnect the circuit; a light source connector is built-in LED lamp bead, the LED lamp bead is electrically connected to the circuit board, and the light source connector is used to connect to the external optical fiber. It boasts advantages such as a simple structure, compact design, and ease of use.

6 Claims, 4 Drawing Sheets

OPTICAL FIBER LIGHT SOURCE

TECHNICAL FIELD

The present invention relates to the technical field of light source equipment, and in particular to an optical fiber light source.

BACKGROUND OF THE PRESENT INVENTION

In the existing light source equipment used on the market, such as those applied to light-emitting clothing, including power supplies, drives, lamp strips and other components, their wire beams are excessively exposed during use, thus are difficult to organize, and inconvenient to use. Over and above that, the same technical problem exists when applied to luminous landscape objects.

Therefore, improvements need to be made.

SUMMARY OF PRESENT INVENTION

The technical problem solved by the present invention is to provide an optical fiber light source in response to the above-mentioned defects in the prior art, so as to solve the problems raised in the above-mentioned technology background.

In order to solve the above technical problems, the technical solution adopted by the invention is as follows: an optical fiber light source, including: a housing, the housing forms an installation space inside; a battery, the battery is installed inside the housing; a circuit board, the circuit board is installed inside the housing, and the circuit board is electrically connected to the battery; a key assembly, the key assembly is arranged on the circuit board, and the key assembly is used to turn on or off the circuit; a light source connector, the number of light source connector is more than one, the light source connector is built-in LED lamp beads, the LED lamp beads are electrically connected to the circuit board, and the light source connector is used to connect with the external optical fiber.

Further, the housing is provided with a mounting groove for holding the light source connector, a positioning bracket disposed in the mounting groove and a thermal conductive glue disposed in the mounting groove; a first end of the light source connector is disposed in the mounting groove, and a second end of the light source connector extends outside the housing; the positioning bracket is disposed at a first end position of the light source connector, and the positioning bracket abuts the light terminal connector in the mounting groove; the thermal conductive glue is wrapped with an outer peripheral surface of the light source connector, and the thermal conductive glue directs heat generated by the light source connector to the housing.

Further, a charging port is included, the charging port is disposed on the circuit board and exposed on the housing, and the charging port is used for charging the battery.

Further, include a waterproof cover disposed at the charging port location for closing or opening the charging port.

Further, a cushioning cotton for cushioning is included, the cushioning cotton being disposed between the housing and the battery.

Further, the key assembly includes a contact disposed on the circuit board, a bracket disposed above the contact, a waterproof casing disposed on the bracket, and a key disposed on the waterproof casing; wherein the bracket is connected to the housing by a screw; and the key is exposed outside the housing.

Further, the upper portion of the housing is provided with an opening for wearing.

Compared with the existing technology, the beneficial effect of the invention is that: the optical fiber light source with a new structure is used to centrally set the battery and light source connector in the shell. The shell is used as a light source while providing endurance. The user only needs to organize the optical fiber, which is more convenient to use, the overall structure is smaller and more compact and is more suitable for wide use.

Figure 1:
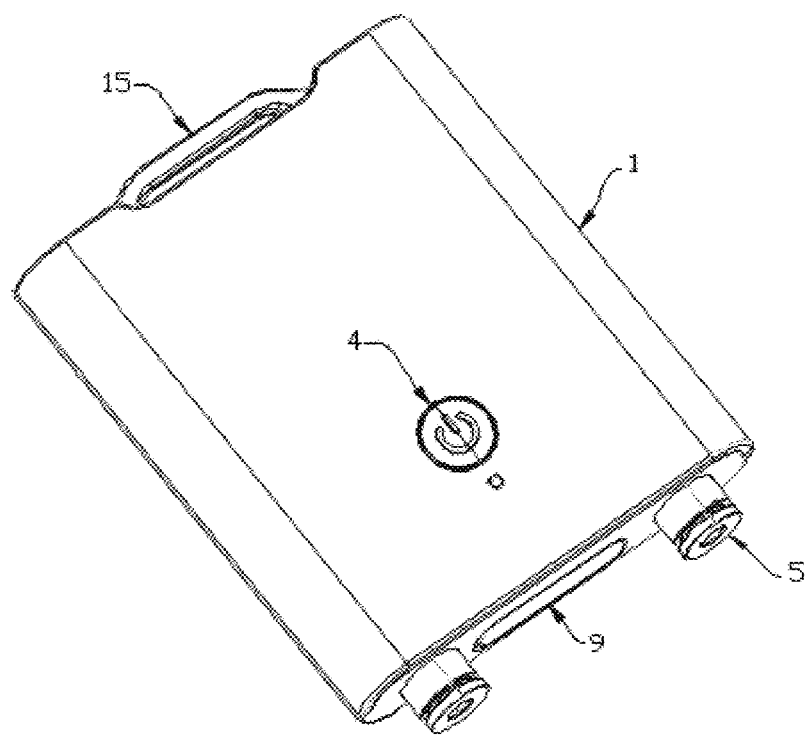
FIG. 1 is a schematic diagram of the structure of the invention.

Attachment markings: 1. Housing; 2. Battery; 3. Circuit board; 4. Key assembly; 5. Light source connector; 6. Mounting groove; 7. Positioning bracket; 8. Charging port; 9. Waterproof cover; 10. Shock absorption cotton; 11. Contacts; 12. Bracket; 13. Waterproof cover; 14. Key; 15. Opening.

DETAILED DESCRIPTION OF THE EMBODIMENT'S

The invention is described in further detail below in conjunction with the accompanying drawings.

The embodiments described by reference to the accompanying drawings are exemplary and are intended to be used to explain the present application and are not to be construed as limiting the present application. In the description of the present application, the terms "center", "longitudinal", "horizontal", "length", "width", "thickness", "up", "down", "front", "back", "left", "right", "vertical", "horizontal", "top", "bottom", "inner", "outer", "clockwise", "counter-clockwise", etc., indicate orientations or positional relationships based on the orientations or positional relationships shown in the drawings and are for the convenience of describing the application and for simplifying the description. It is not an indication or implication that the device or element referred to must have a particular orientation, be constructed and operated in a particular orientation and therefore cannot be construed as a limitation on the present application. In addition, the terms "first", "second" are used for descriptive purposes only and are not to be understood as indicating or implying a relative importance or an implicit indication of the number of technical features indicated. Thus, features defining "first", "second" may include one or more of the features explicitly or implicitly. In the description of this application, the meaning of "several", "multiple" is two or more, unless specifically defined otherwise. In the present disclosure, unless otherwise clearly specified and limited, the terms "install", "connect", "couple", "fix", "hold" and other terms should be understood in a broad sense. For example, it can be a fixed connection, a detachable connection, or an integral connection. It can be mechanical connection, it can also be electrical connection; it can be directly connected, or it can be indirectly connected through an intermediate medium, and it can be the connection within two components For those of ordinary skill in the art, the specific meaning of the above terms in the present application may be understood on a case-by-case basis. In the present application, unless otherwise expressly specified and defined, the first feature "above" or "below" the second feature may include direct contact of the first and second features or may include contact of the first and second features not directly but through additional features between them. Moreover, the first feature being "above", "on", and "up" the second feature includes the first feature being directly above and obliquely above the second feature, or merely indicating that the first feature level is higher than the second feature. The first feature being "below", "under", and "lower" the second feature includes the first feature being directly above and obliquely above the second feature, or simply indicating that the first feature level height is less than the second feature.

As shown in FIGS. 1-4, an optical fiber light source is provided, including: a housing 1, the interior of the housing 1 forms an installation space; a battery 2, the battery 2 is mounted inside the housing 1; a circuit board 3, the circuit board 3 is mounted inside the housing 1, and the circuit board 3 is electrically connected to the battery 2; a key assembly 4, the key assembly 4 is provided on the circuit board 3, and the key assembly 4 is used to turn on or turn off the circuit; a light source connector 5, the light source connector 5 is more than one, the light source connector 5 has built-in LED lamp beads, the LED lamp beads are electrically connected to the circuit board 3, and the light source connector 5 is used to connect with external optical fibers.

In view of the technical problems described in the background, an optical fiber light source is provided, the main purpose of which is to carry out integrated design inside the housing 1, install the battery 2, the circuit board 3 and the light source connector 5 inside the housing 1, and use the entire optical fiber light source as a light source with long endurance. In use, only the external optical fiber needs to be connected and used, and the optical fiber is laid out according to the desired path.

The housing 1 is assembled with the upper housing and the lower housing to form an internal installation space, the battery 2 is installed inside the housing 1, the battery 2 can choose the battery 2 that can be recharged or the battery 2 that cannot be recharged, the control circuit is set correspondingly on the circuit board 3 according to the use requirements, the key assembly 4 is used as a switch for private use, the light source connector 5 is used to provide a light source, and the LED lamp beads are set in the light source connector 5, which can be rgb-LED lamp beads.

In the specific use process, users connect the optical fiber to the light source connector 5, presses the key assembly 4 to connect the circuit, the light source connector 5 emits light, and the light is conducted through the optical fiber, thereby realizing the light-emitting line style.

Users using the above structure only need to organize the optical fibers, which is more convenient to use, and the overall structure of the light source is smaller and more compact, which is more suitable for wide use.

Figure 2:
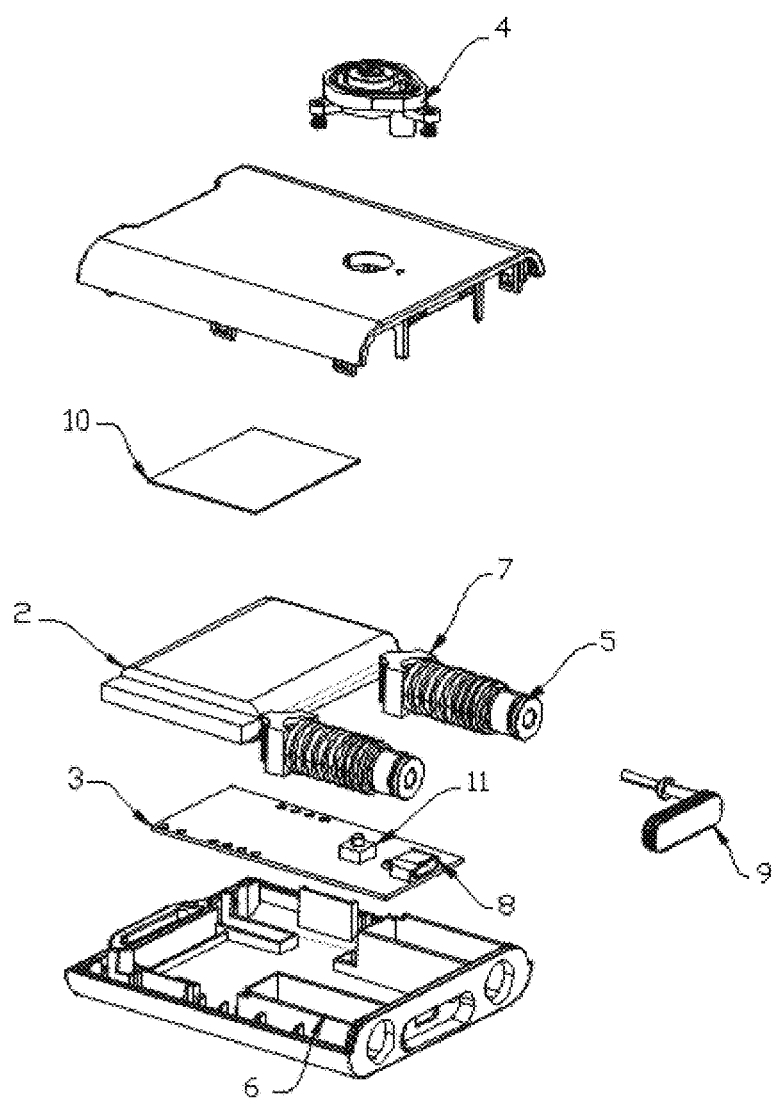
FIG. 2 is a schematic diagram of the structure of the invention.
Figure 3:
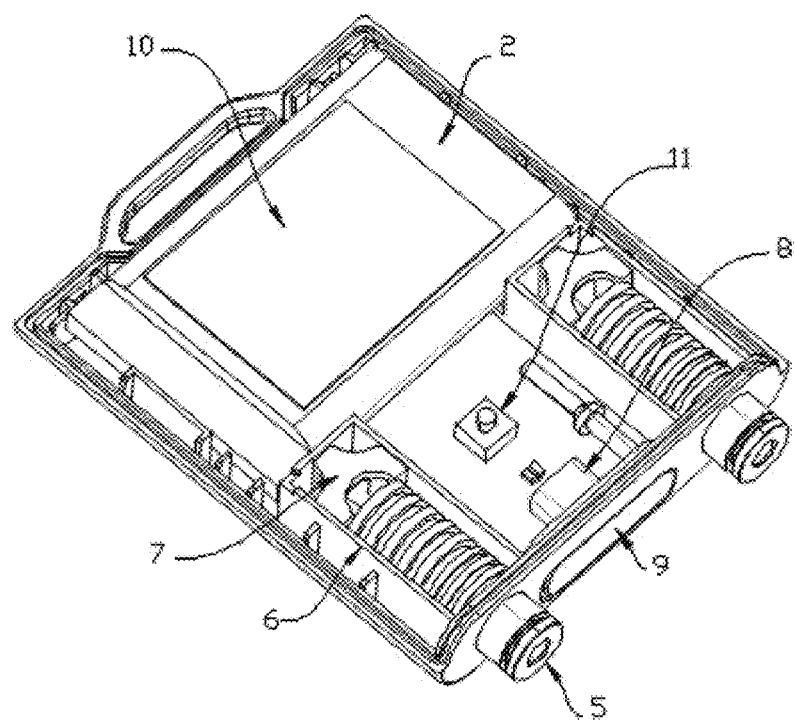
FIG. 3 is a schematic diagram of the internal structure of the invention.

Referring to FIGS. 2-3, the housing 1 is provided with a mounting groove 6 for holding the light source connector 5, a positioning bracket 7 arranged in the mounting groove 6 and a thermal conductive glue arranged in the mounting groove 6; the first end of the light source connector 5 is placed in the mounting groove 6, and the second end of the light source connector 5 extends outside the housing 1; the positioning bracket 7 is placed in the first end position of the light source connector 5, and the positioning bracket 7 abuts the optical end connector in the mounting groove 6; the thermal conductive glue is wrapped with the outer peripheral surface of the light source connector 5, and the thermal conductive glue directs heat generated by the light source connector 5 to the housing 1.

Since the light source connector 5 is prone to generate heat during use, heat needs to be exported.

In view of the above problems, in this embodiment, the light source connector 5 is two, two mounting grooves 6 are correspondingly arranged in the housing 1, the light source connector 5 is placed in the mounting groove 6, and one end of the light source connector 5 is extended outside the mounting groove 6. In order to achieve the fixation of the light source connector 5, a positioning bracket 7 is placed in the mounting groove 6, and the light source connector 5 is fixed using the positioning bracket 7, so that the light source connector 5 can be avoided from shifting in the subsequent glue injection process. After the glue injection, a heat conducting glue is formed to wrap the light source connector 5. When the light source connector 5 is hot, the heat conducting glue is used to guide the heat to the outside of the housing 1 for heat dissipation. Thermal glue is not shown in the attached figures.

Specifically, a charging port 8 is included, which is provided on the circuit board 3 and exposed on the housing 1. The charging port 8 is used for charging the battery 2. The charging port 8 can be in the form of a USB interface, a type-c interface, a lightning interface, etc., and using the charging port 8, the battery 2 is cycled charged.

Preferably, a waterproof cover 9 is included, the waterproof cover 9 is provided at the position of the charging port 8, and the waterproof cover 9 is used to close or open the charging port 8.

To improve waterproof performance, fit the waterproof cover 9 on the charging port 8. When charging is not required, use the waterproof cover 9 to close the charging port 8 to achieve waterproof function.

Specifically, a shock-absorbing cotton 10 for cushioning shocks is included, the shock-absorbing cotton 10 being disposed between the housing 1 and the battery 2. The shock absorbing cotton 10 is provided to provide a buffer against external forces to protect the battery 2.

Figure 4:
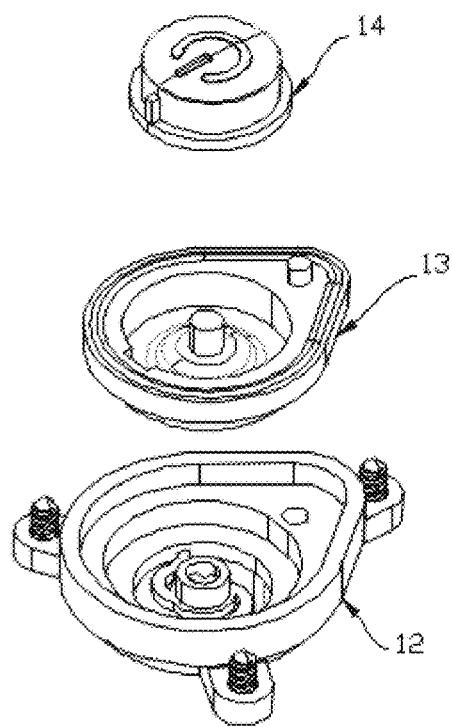
FIG. 4 is a schematic diagram of the explosion structure of the key assembly.

Referring to FIG. 4, the key assembly 4 includes a contact 11 disposed on the circuit board 3, a bracket 12 disposed above the contact 11, a waterproof sleeve 13 disposed on the bracket 12, and a key 14 disposed on the waterproof sleeve 13; wherein the bracket 12 is connected to the housing 1 by a screw; and the key 14 is exposed outside the housing 1.

In use, the key assembly 4 used includes a contact 11, a bracket 12, a waterproof sleeve 13, and a key 14. The contact 11 is provided on the circuit board 3, and an external force pressing the key 14 triggers the contact 11 to turn on the circuit. At the same time, in order to facilitate the installation of the key 14 and the waterproof function, the bracket 12 is set. During installation, the key 14 is placed on the preset hole position of the housing 1, the waterproof sleeve 13 is placed on the key 14, and then the bracket 12 is screwed to the housing 1, so that the key 14 and the waterproof sleeve 13 are firmly set on the housing 1.

Further, the upper part of the housing 1 is provided with an opening 15 for wearing. Since the housing 1 can be carried on the human body when in use, the product can be fixed to the clothes by adding the opening 15 for strapping or other ropes on the clothes.

The above does not limit the technical scope of the invention. Any modifications, equivalent changes and modifications made to the above embodiments based on the essence of the invention technology still fall within the scope of the technical solution of the invention.

The invention claimed is:

1. An optical fiber light source, characterized in that it comprises:
   a housing that internally forms a mounting space;
   a battery mounted inside the housing;
   a circuit board mounted inside the housing, the circuit board being electrically connected to the battery;
   a key assembly, the key assembly being disposed on the circuit board, the key assembly being used to turn on or off a circuit;
   a light source connector, wherein the light source connector is used for connecting with an external optical fiber;
   wherein the housing is provided with a mounting groove for holding the light source connector, a positioning bracket arranged in the mounting groove and a thermal conductive glue arranged in the mounting groove; the first end of the light source connector is placed in the mounting groove, and the second end of the light source connector extends outside the housing; the positioning bracket is placed in the first end position of the light source connector, and the positioning bracket abuts the optical end connector in the mounting groove; the thermal conductive glue is wrapped with the outer peripheral surface of the light source connector, and the thermal conductive glue directs heat generated by the light source connector to the housing.

2. The optical fiber light source according to claim 1, characterized in that: including a charging port, the charging port is disposed on the circuit board and exposed on the housing, the charginf port is used for charging the battery.

3. The optical fiber light source according to claim 2, characterized in that: including a waterproof cover, the waterproof cover is disposed at the charging port position, the waterproof cover is used for closing or opening the charging port.

4. The optical fiber light source according to claim 1, characterized in that it comprises a shock absorbing cotton for shock absorption, the shock absorbing cotton being disposed between the housing and the battery.

5. The optical fiber light source according to claim 1, characterized characterized in that the key assembly includes a contact disposed on the circuit board, a bracket disposed above the contact, a waterproof sleeve disposed on the bracket, and a key disposed on the waterproof sleeve; wherein the bracket is connected to the housing by a screw; and the key is exposed outside the housing.

6. The optical fiber light source according to claim 1, characterized in that an upper part of the housing is provided with an opening for wearing.

\* \* \* \* \*